US012568044B2

(12) United States Patent
Menes et al.

(10) Patent No.: US 12,568,044 B2
(45) Date of Patent: Mar. 3, 2026

(54) INTER-PLANE ACCESS

(71) Applicant: MELLANOX TECHNOLOGIES, LTD., Yokneam (IL)

(72) Inventors: Yoav Menes, Tel Aviv (IL); Guy Rozenberg Kunievsky, Rehovot (IL); Daniel Klein, Tel Aviv (IL); Vladimir Koushnir, Rishon Le Zion (IL); Michael Avimelech Gandelman Milgrom, Aventura, FL (US); Eitan Zahavi, Zichron Yaakov (IL); Matty Kadosh, Hedera (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 399 days.

(21) Appl. No.: 18/120,822

(22) Filed: Mar. 13, 2023

(65) Prior Publication Data

US 2024/0314067 A1     Sep. 19, 2024

(51) Int. Cl.
    *H04L 45/00*     (2022.01)
    *H04L 45/18*     (2022.01)
    *H04L 49/113*     (2022.01)

(52) U.S. Cl.
    CPC .............. *H04L 45/54* (2013.01); *H04L 45/18* (2013.01); *H04L 45/22* (2013.01); *H04L 49/113* (2022.05)

(58) Field of Classification Search
None
See application file for complete search history.

(56) References Cited

U.S. PATENT DOCUMENTS

| | | |
|---|---|---|
| 4,965,788 A | 10/1990 | Newman |
| 7,054,263 B1 | 5/2006 | Lindblom et al. |
| 7,058,027 B1 | 6/2006 | Alessi et al. |
| 7,257,758 B1 | 8/2007 | Manula et al. |
| 7,668,981 B1 | 2/2010 | Nagineni et al. |
| 8,886,783 B2 | 11/2014 | Johnsen et al. |
| 8,958,420 B1 | 2/2015 | Shekhar et al. |
| 10,382,396 B2 | 8/2019 | Itkin et al. |
| 11,750,513 B2 | 9/2023 | Bogdanski et al. |
| 11,895,015 B1 | 2/2024 | Budhia et al. |
| 11,909,671 B1 | 2/2024 | Chaves et al. |
| 11,991,073 B1 * | 5/2024 | Eran .................... H04L 41/044 |
| 2002/0064336 A1 | 5/2002 | Graves et al. |
| 2003/0120852 A1 | 6/2003 | McConnell et al. |
| 2004/0001503 A1 | 1/2004 | Manter |
| 2004/0213220 A1 | 10/2004 | Davis |
| 2005/0271073 A1 | 12/2005 | Johnsen et al. |
| 2005/0273641 A1 | 12/2005 | Sandven et al. |

(Continued)

OTHER PUBLICATIONS

U.S. Appl. No. 18/073,662, filed Dec. 2, 2022, Bashan et al.

(Continued)

*Primary Examiner* — Xavier S Wong
(74) *Attorney, Agent, or Firm* — Sheridan Ross P.C.

(57) ABSTRACT

A network device, communication system, and method are provided. In one example, a network device is described that includes a plurality of switching elements, each switching element in the plurality of switching elements corresponding to a different plane from a plurality of planes in a planarized network. The network device also includes a ring mechanism generated based on a set of rules that permits inter-plane connectivity between the plurality of switching elements.

20 Claims, 6 Drawing Sheets

TOR Switch 401b

Intermediary Switch 403

Uplinks

404

TOR Switch 401a

Downlinks 402    400

(56) References Cited

U.S. PATENT DOCUMENTS

| | | | |
|---|---|---|---|
| 2006/0006905 A1 | 1/2006 | Chou et al. | |
| 2006/0116023 A1 | 6/2006 | Spitaels et al. | |
| 2008/0304428 A1* | 12/2008 | Stilling | H04L 45/48 |
| | | | 370/256 |
| 2010/0095064 A1 | 4/2010 | Aviles | |
| 2010/0098089 A1 | 4/2010 | Makino | |
| 2010/0115174 A1 | 5/2010 | Akyol et al. | |
| 2010/0310253 A1 | 12/2010 | Kokje et al. | |
| 2011/0228789 A1 | 9/2011 | Jia | |
| 2013/0054947 A1 | 2/2013 | Gavrilov | |
| 2013/0089089 A1 | 4/2013 | Kamath et al. | |
| 2013/0142197 A1 | 6/2013 | Lacroute et al. | |
| 2013/0275835 A1* | 10/2013 | Aswadhati | G06F 11/1068 |
| | | | 714/773 |
| 2013/0347092 A1 | 12/2013 | McBrearty et al. | |
| 2014/0078904 A1 | 3/2014 | Yu | |
| 2014/0112338 A1 | 4/2014 | Huang | |
| 2014/0177639 A1 | 6/2014 | Vershkov et al. | |
| 2014/0211808 A1 | 7/2014 | Koren et al. | |
| 2014/0301401 A1 | 10/2014 | Wang et al. | |
| 2015/0172112 A1 | 6/2015 | Itkin et al. | |
| 2015/0181317 A1* | 6/2015 | Yin | H04J 14/0286 |
| | | | 398/45 |
| 2015/0338909 A1 | 11/2015 | Woodruff | |
| 2017/0180264 A1 | 6/2017 | Izenberg et al. | |
| 2017/0264554 A1 | 9/2017 | Contavalli | |
| 2017/0302525 A1 | 10/2017 | Chen et al. | |
| 2017/0324681 A1 | 11/2017 | Johnsen et al. | |
| 2018/0183758 A1 | 6/2018 | Itkin et al. | |
| 2019/0007346 A1 | 1/2019 | Johnsen et al. | |
| 2019/0012278 A1 | 1/2019 | Sindhu et al. | |
| 2019/0079897 A1* | 3/2019 | Kochevar-Cureton | |
| | | | H04L 12/4641 |
| 2019/0190777 A1* | 6/2019 | Uchizumi | H04L 12/66 |
| 2019/0245751 A1 | 8/2019 | Wong | |
| 2019/0379594 A1* | 12/2019 | Johnsen | H04L 45/021 |
| 2020/0104275 A1 | 4/2020 | Sen et al. | |
| 2020/0136999 A1 | 4/2020 | Abegnoli et al. | |
| 2020/0159568 A1 | 5/2020 | Goyal et al. | |
| 2020/0371828 A1 | 11/2020 | Chiou et al. | |
| 2021/0051115 A1 | 2/2021 | Annamary et al. | |
| 2021/0152494 A1 | 5/2021 | Johnsen et al. | |
| 2021/0263866 A1* | 8/2021 | Norman | G06F 13/1668 |
| 2022/0124036 A1 | 4/2022 | Yan et al. | |
| 2022/0245522 A1* | 8/2022 | Ramachandran | G06N 3/045 |
| 2022/0335563 A1 | 10/2022 | Elzur | |
| 2022/0385579 A1 | 12/2022 | Rangel et al. | |

OTHER PUBLICATIONS

U.S. Appl. No. 18/114,860, filed Feb. 27, 2023, Levi et al.
U.S. Appl. No. 18/132,519, filed Apr. 10, 2023, Eran et al.
U.S. Appl. No. 18/200,443, filed May 22, 2023, Eran et al.

* cited by examiner

TOR Switch
401b

Intermediary
Switch 403

Uplinks

TOR Switch
401a

Downlinks

404

402

400

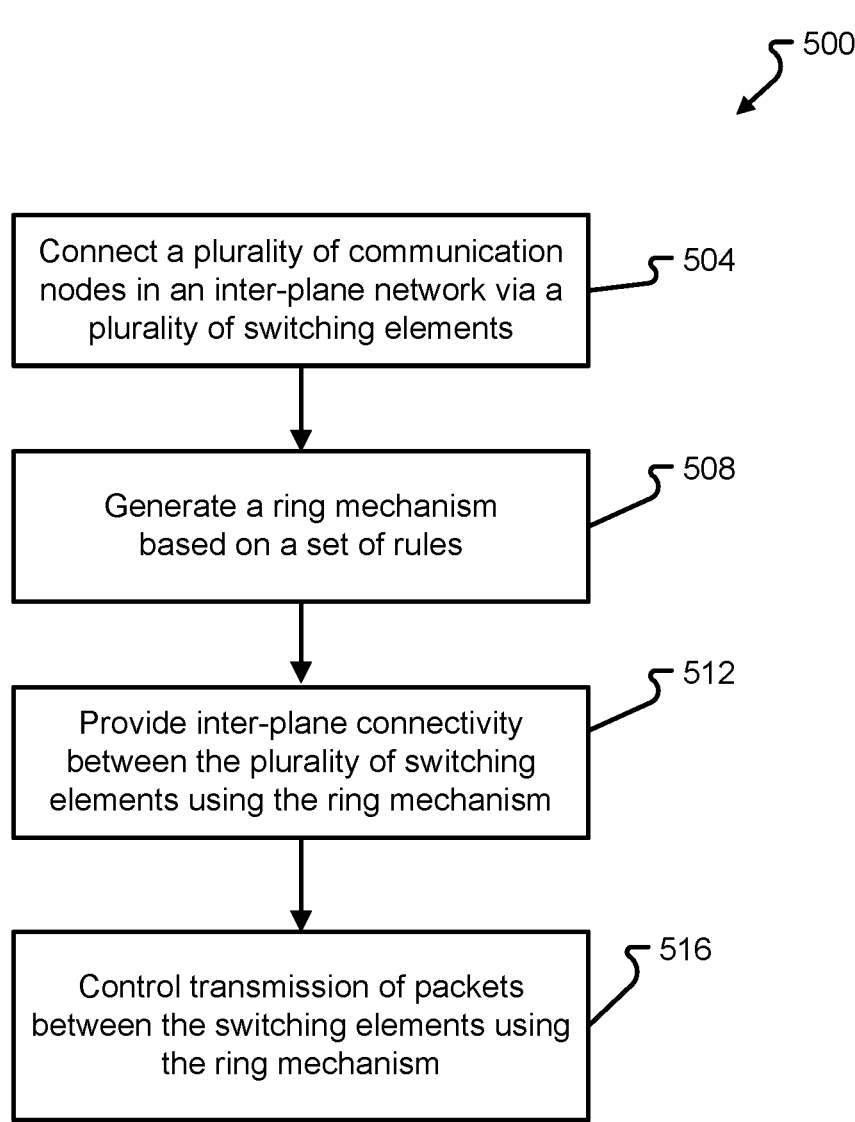

┌─ 500

┌─ 504
Connect a plurality of communication
nodes in an inter-plane network via a
plurality of switching elements ┌─ 508
Generate a ring mechanism
based on a set of rules ┌─ 512
Provide inter-plane connectivity
between the plurality of switching
elements using the ring mechanism ┌─ 516
Control transmission of packets
between the switching elements using
the ring mechanism

*FIG. 5*

INTER-PLANE ACCESS

FIELD OF THE DISCLOSURE

The present disclosure is generally directed toward networking and, in particular, toward networking devices, switches, and methods of operating the same.

BACKGROUND

Switches and similar network devices represent a core component of many communication, security, and computing networks. Switches are often used to connect multiple devices, device types, networks, and network types.

Given a topology and routing rules, a credit loop is defined as a cyclic sequence of switch buffers, such that every switch in the sequence sends traffic to the next switch in the sequence. This sequence is dependent on the existence of at least one routing rule, wherein a switch forwards packets arriving via a link in the sequence to the next link in the sequence. A credit loop deadlock occurs when all the switch buffers on the sequence become full and no traffic can be propagated.

Credit loops are a silent killer; they may exist for a long time but cause deadlocks only with specific traffic patterns. Although existing credit loops rarely deadlock, when they do, they can block large parts of the network. Naïve solutions recover from credit loop deadlock by draining buffers and dropping packets. Previous works have suggested credit loop avoidance by central routing algorithms, but these assume specific topologies and are slow to react to failures.

BRIEF SUMMARY

Network topology describes the arrangement of the network elements (links, nodes, etc.) of a communication network. Network topology is the structure of a network and may be depicted physically or logically. Physical topology is the placement of the various components of a network (e.g., device location and cable installation), while logical topology illustrates how data flows within a network. Logically, a network may be separated into separate parallel planes, which allows support of larger scale networks at low latency. The number of planes may vary and depends on the topology structure of a network and the number of connected devices.

Throughout the instant description, a switch integrated circuit (IC) should generally be understood to comprise switching hardware, such as an application specific integrated circuit (ASIC) that has switching capabilities. Multiplane network devices and non-multiplane network devices used in multiplane networks described herein may each include a single switch IC or multiple switch ICs.

Inventive concepts relate to network devices for a multiplane network (also called a planarized network or planarization or the like). A multiplane network may be implemented by dividing the switching fabric of a traditional communication network into multiple planes. For example, a related art, non-multiplane network device for High Performance Computing (HPC) systems may include a single high-bandwidth switch IC that is managed on a per-switch IC basis along with other high-bandwidth switches in the same network device or in other network devices of the switching fabric.

A multiplane network device according to inventive concepts, however, is a network device having multiple smaller-bandwidth switch ICs that, when taken collectively, have an aggregated bandwidth equal to the single high-bandwidth switch IC of the related art. In addition, the multiple smaller bandwidth switch ICs of a multiplane network device may not be visible to the user (e.g., the multiple switch ICs are not exposed to an application programming interface (API) that enables user interaction with the network so that applications can use the network without being aware of the planes). Stated another way, the system is constructed such that applications perceive the multiple smaller bandwidth switch ICs of a multiplane network device as a single, larger bandwidth switch IC.

Embodiments of the present disclosure aim to solve the above-noted shortcomings and other issues by implementing an improved routing approach. The routing approach depicted and described herein may be applied to a switch, a router, or any other suitable type of networking device known or yet to be developed. As will be described in further detail herein, a switch that implements the routing approaches described herein may correspond to an optical routing switch (e.g., an Optical Circuit Switch (OCS)), an electrical switch, a combined electro-optical switch, or the like. The routing approach provided herein may utilize a ring mechanism to permit inter-plane connectivity (e.g., allowing traffic to cross planes) with credit loop prevention.

In an illustrative example, a network device is disclosed that includes: a plurality of switching elements, wherein each switching element in the plurality of switching elements corresponds to a different plane from a plurality of planes, wherein a ring mechanism permits inter-plane connectivity between the plurality of switching elements, and wherein the ring mechanism is generated based on a set of rules.

In another example, a system is disclosed that includes: a switch comprising a plurality of switching elements, wherein each switching element in the plurality of switching elements corresponds to a different plane of a plurality of planes, wherein a ring mechanism permits inter-plane connectivity between the plurality of switching elements, and wherein the ring mechanism is generated based on a set of rules.

In yet another example, a device is disclosed that includes a plurality of switching elements for routing traffic to an endpoint, wherein each switching element in the plurality of switching elements corresponds to a different plane of a plurality of planes, and wherein a ring mechanism controls inter-plane connectivity between the plurality of switching elements based on a set of rules.

In yet another example, a method of routing packets is disclosed that includes: generating a ring mechanism based on a set of rules to route data traffic between a plurality of switching elements, wherein each switching element in the plurality of switching elements corresponds to a different plane from a plurality of planes in an inter-plane network.

Any of the above example aspects include wherein the plurality of switching elements are provided in a Top-of-rack (TOR) switch.

Any of the above example aspects include wherein the plurality of switching elements comprise Single-ASIC switching elements.

Any of the above example aspects include wherein each switching element in the plurality of switching elements is assigned a unique local identifier (LID).

Any of the above example aspects include wherein each switching element in the plurality of switching elements has its own forwarding table for inter-plane connectivity.

Any of the above example aspects include wherein transmission between the plurality of planes comprises parallel transmission across two or more of the plurality of planes.

Any of the above example aspects include wherein the plurality of switching elements comprises at least four switching elements.

Any of the above example aspects include wherein the set of rules indicate that only traffic addressed to a local identifier (LID) assigned to a switching element is permitted to cross planes.

Any of the above example aspects include wherein the set of rules indicate that if traffic received via a downlink ingress port is permitted to cross planes, then traffic received via an uplink port is not permitted to cross planes.

Any of the above example aspects include wherein the ring mechanism includes an open line segment.

Any of the above example aspects include wherein the open line segment is created by reserving one link in the ring mechanism as a backup path, wherein the one link is not used to transport traffic.

Any of the above example aspects include wherein the set of rules indicate that if incoming traffic from an uplink port is permitted to cross planes, then incoming traffic from a downlink port is not permitted to cross planes.

Any of the above example aspects include wherein traffic is routed between servers in a high-performance computing network.

Any of the above example aspects include a network of switches to route data traffic to an endpoint, wherein the endpoint comprises a host channel adapter (HCA).

Any of the above example aspects include wherein the HCA is plane agnostic.

Any of the above example aspects include wherein the plurality of switching elements comprises at least four Single-ASIC switching elements housed in a same housing, and wherein the plurality of switching elements share external utilities.

Any of the above example aspects include wherein the plurality of switching elements are provided in a Top-of-rack (TOR) switch, and wherein the plurality of switching elements comprise Single-ASIC switching elements.

Any of the above example aspects include wherein the set of rules indicate one or more of: (i) only traffic addressed to a local identifier (LID) assigned to a switching element is permitted to cross planes; (ii) if traffic received via a downlink ingress port is permitted to cross planes, then traffic received via an uplink port is not permitted to cross planes; (iii) if traffic from an uplink ingress port is permitted to cross planes, then traffic from a downlink port is not permitted to cross planes; and (iv) one link in the ring mechanism is reserved as a backup path and is not used to transport data traffic.

Any of the above example aspects include wherein the switching hardware comprises optical communication components, and wherein the packets are transmitted across the switching hardware using an optical signal.

Any of the above example aspects include wherein the switching hardware comprises electrical communication components, and wherein the packets are transmitted across the switching hardware using an electrical signal.

Any of the above example aspects include wherein the first range of addresses comprises addresses in a local forwarding table.

Any of the above example aspects include wherein the second range of addresses comprises addresses from a plurality of shared forwarding tables.

Additional features and advantages are described herein and will be apparent from the following Description and the figures.

BRIEF DESCRIPTION OF THE SEVERAL VIEWS OF THE DRAWINGS

The present disclosure is described in conjunction with the appended figures, which are not necessarily drawn to scale:

FIG. 5 is a flow diagram depicting a method of routing packets in accordance with at least some embodiments of the present disclosure.

DETAILED DESCRIPTION

Figure 1:
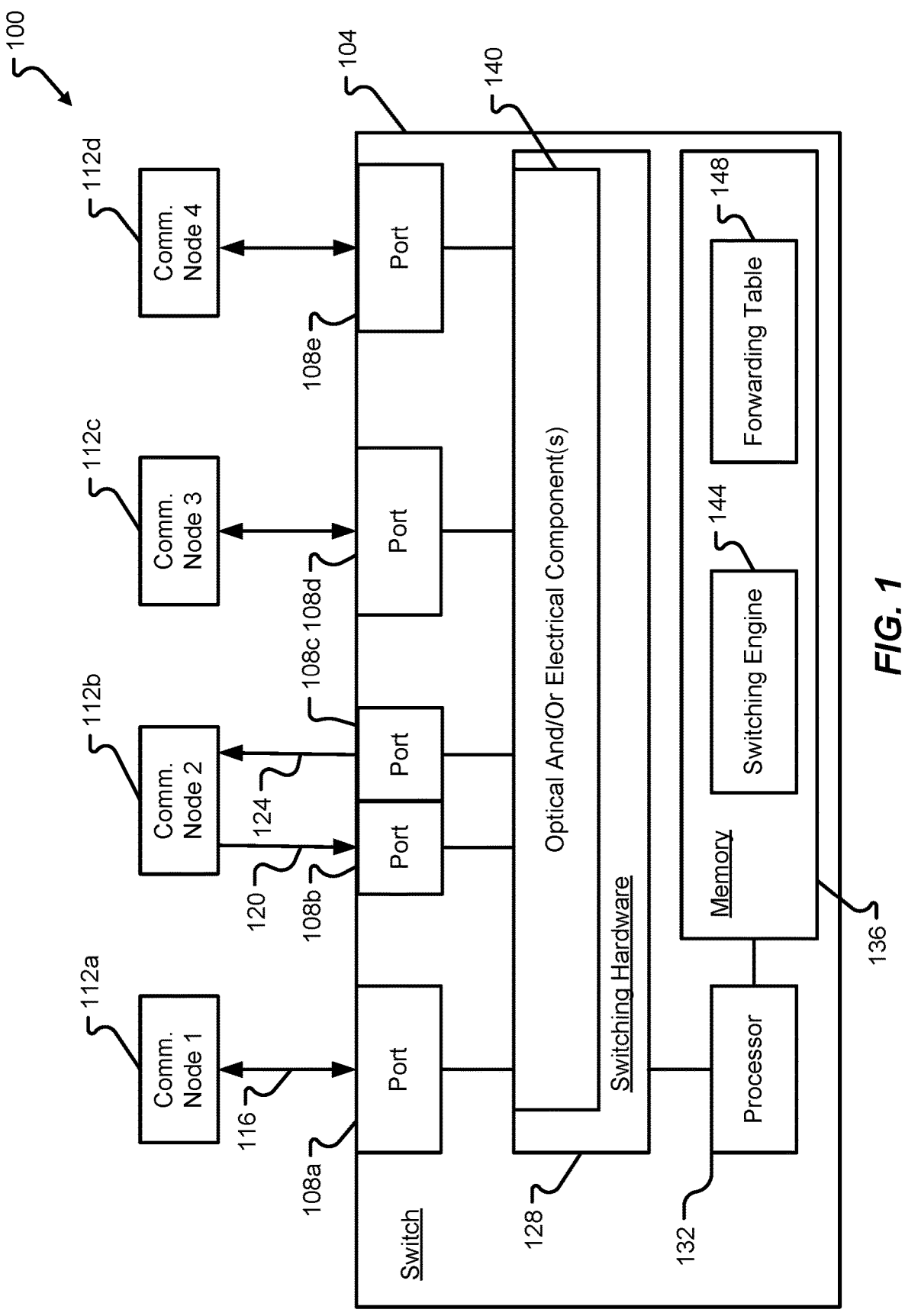
FIG. 1 is a block diagram depicting an illustrative configuration of a switch in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means: A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," and "compute," and variations thereof, as used herein, are used interchangeably and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-5, various systems and methods for routing packets between communication nodes will be described. The concepts of packet routing depicted and described herein can be applied to the routing of information from one computing device to another. The term packet as used herein should be construed to mean any suitable discrete amount of digitized information. The information being routed may be in the form of a single packet or multiple packets without departing from the scope of the present disclosure. Furthermore, certain embodiments will be described in connection with a system that is configured to make centralized routing decisions whereas other embodiments will be described in connection with a system that is configured to make distributed and possibly uncoordinated routing decisions. It should be appreciated that the features and functions of a centralized architecture may be applied or used in a distributed architecture or vice versa.

FIG. 1 illustrates a possible configuration of a communication system 100 in accordance with at least some embodiments of the present disclosure. It should be appreciated that the components described with reference to FIG. 1 may or may not also be used in a communication system as shown in FIGS. 1-4.

In the configuration of FIG. 1, a communication system 100 is shown to include a switch 104 connecting one or more communication nodes 112 via a number of communication ports 108. The illustrated switch 104 is shown to be connected with four communication nodes 112a-d via a plurality of communication ports 108. The illustration of four communication nodes 112a-d is for ease of discussion and should not be construed as limiting embodiments of the present disclosure. Specifically, a switch 104 may be configured to connect any suitable number of communication nodes 112 and the switch 104 may include a number of ports 108 to facilitate such connections. Even more specifically, a switch 104 may be configured to connect a greater or lesser number of communication nodes 112 than are shown in FIG. 1. Moreover, embodiments of the present disclosure contemplate that not all ports 108 of a switch 104 need to be connected with a communication node 112. For instance, one or more ports 108 of a switch 104 may be left unconnected (e.g., open) and may not have any particular networking cable 116 plugged into the port 108.

The communication nodes 112a-d may be the same type of devices or different types of devices. As a non-limiting example, some or all of the communication nodes 112a-d may correspond to a Top-of-rack (TOR) switch. Alternatively or additionally, one or more of the communication nodes 112a-d may correspond to a device other than a TOR switch. The communication nodes 112a-d do not necessarily need to communicate using the same communication protocol because the switch 104 may include components to facilitate protocol conversion and/or a communication node 112 may be connected to the switch 104 via a pluggable network adapter.

While the communication nodes 112a-d may correspond to a TOR switch, one or more of the communication nodes 112a-d may be considered host devices, servers, network appliances, data storage devices, or combinations thereof. A communication node 112, in some embodiments, may correspond to one or more of a Personal Computer (PC), a laptop, a tablet, a smartphone, a server, a collection of servers, or the like. It should be appreciated that a communication node 112 may be referred to as a host, which may include a network host, an Ethernet host, an InfiniBand (IB) host, NVLink hosts, etc. As another specific but non-limiting example, one or more of the communication nodes 112 may correspond to a server offering information resources, services and/or applications to user devices, client devices, or other hosts in the communication system 100. It should be appreciated that the communication nodes 112 may be assigned at least one network address (e.g., an IP address) and the format of the network address assigned thereto may depend upon the nature of the network to which the communication node 112 is connected.

FIG. 1 illustrates that one or multiple networking cables may be used to connect a communication node 112 to the switch 104. In some embodiments, a communication node 112 (e.g., the first communication node 112a, third communication node 112c, and fourth communication node 112d) may connect to a single port 108 (e.g., the first port 108a, fourth port 108d, and fifth port 108e) via a bidirectional communication link 116. The bidirectional communication link 116 may be established over a networking cable and may utilize any suitable communication protocol known or yet to be developed for the transmission of data packets.

A communication node 112 (e.g., the second communication node 112b) may alternatively, or additionally, be connected with the switch 104 via multiple ports 108 (e.g., the second port 108b and third port 108c). In such a configuration, one of the ports 108 may be used to carry packets from the switch 104 to the communication node 112 whereas the other of the ports 108 may be used to carry packets from the communication node 112 to the switch 104. As an example, the second port 108b is shown to receive packets from the second communication node 112b via a data uplink 120 whereas the third port 108c is shown to carry packets from the switch 104 to the second communication node 112b via a data downlink 124. In this configuration, separate networking cables may be used for the data uplink 120 and the data downlink 124.

The switch 104 may correspond to an optical switch and/or electrical switch. In some embodiments, the switch 104 may include switching hardware 128 that is configurable to selectively interconnect the plurality of ports 108a-e, thereby enabling communications between the plurality of ports 108a-e, which enables communications between the communication nodes 112a-d. In some embodiments, the switching hardware 128 may be configured to selectively enable the plurality of communication nodes 112*a-d* to communicate in pairs based on a particular configuration of the switching hardware 128. Specifically, the switching hardware 128 may include optical and/or electrical component(s) 140 that are switchable between different matching configurations. In some embodiments, the optical and/or electrical components 140 may be limited in the number of matching configurations it can accommodate, meaning that a port 108 may not necessarily be connected with/matched with every other port 108 at a particular instance in time.

In some embodiments, the switch 104 may correspond to an optical circuit switch, which means that the optical and/or electrical components 140 may include a number of optical and/or opto-electronic components that switch optical signals from one channel to another. The optical and/or electrical components 140 may be configured to provide an optical switching fabric, in some embodiments. As an example, the optical and/or electrical component(s) 140 may be configured to operate by mechanically shifting or moving an optical fiber to drive one or more alternative fibers. Alternatively, or additionally, the optical and/or electrical component(s) 140 may include components that facilitate switching between different port matchings by imparting electro-optic effects, magneto-optic effects, or the like. For instance, micromirrors, piezoelectric beam steering mechanisms, liquid crystals, filters, and the like may be provided in the optical and/or electrical components 140 to facilitate switching between different matching configurations of optical channels.

In some embodiments, the switch 104 may correspond to an electrical switch, which means that the optical and/or electrical components 140 may include a number of electrical components or traditional electronic circuitry that is configured to manage packet flows and packet transmissions. Accordingly, the optical and/or electrical components 140 may alternatively or additionally include one or more Integrated Circuit (IC) chips, microprocessors, circuit boards, Data Processing Units (DPUs), simple analog circuit components (e.g., resistors, capacitors, inductors, etc.), digital circuit components (e.g., transistors, logic gates, etc.), memory devices, Field Programmable Gate Arrays (FPGAs), Application Specific Integrated Circuits (ASICs), combinations thereof, and the like.

The switch 104 may correspond to an optical switch and/or electrical switch. In some embodiments, the switch 104 may include switching hardware 128 that is configurable to selectively interconnect the plurality of ports 108*a-e,* thereby enabling communications between the plurality of ports 108*a-e,* which enables communications between the communication nodes 112*a-d.*

In some embodiments, the switch 104 may include a processor 132 that executes the switching engine 144, which is stored in memory 136. The forwarding table 148 may also be stored in memory 136 and may be referenced by the processor 132 when executing the switching engine 144.

Although not depicted, a communication node 112 may include a processor 132 and memory 136 as shown in the switch 104 of FIG. 1. The communication nodes 112*a-d* are not shown with a processor 132 and memory 136 for ease of discussion and clarity of the drawings, but this should not be construed as limiting embodiments of the present disclosure.

The processor 132 (whether provided in the switch 104 or a communication node 112) may be configured to execute the instructions (e.g., the switching engine 144) stored in memory 136. As some non-limiting examples, the processor 132 may correspond to a microprocessor, an IC chip, a Central Processing Unit (CPU), a Graphics Processing Unit (GPU), a DPU, or the like. The memory 136 may correspond to any appropriate type of memory device or collection of memory devices configured to store instructions. Non-limiting examples of suitable memory devices that may be used for memory 136 include Flash memory, Random Access Memory (RAM), Read Only Memory (ROM), variants thereof, combinations thereof, or the like. In some embodiments, the memory 136 and processor 132 may be integrated into a common device (e.g., a microprocessor may include integrated memory).

Figure 2A:
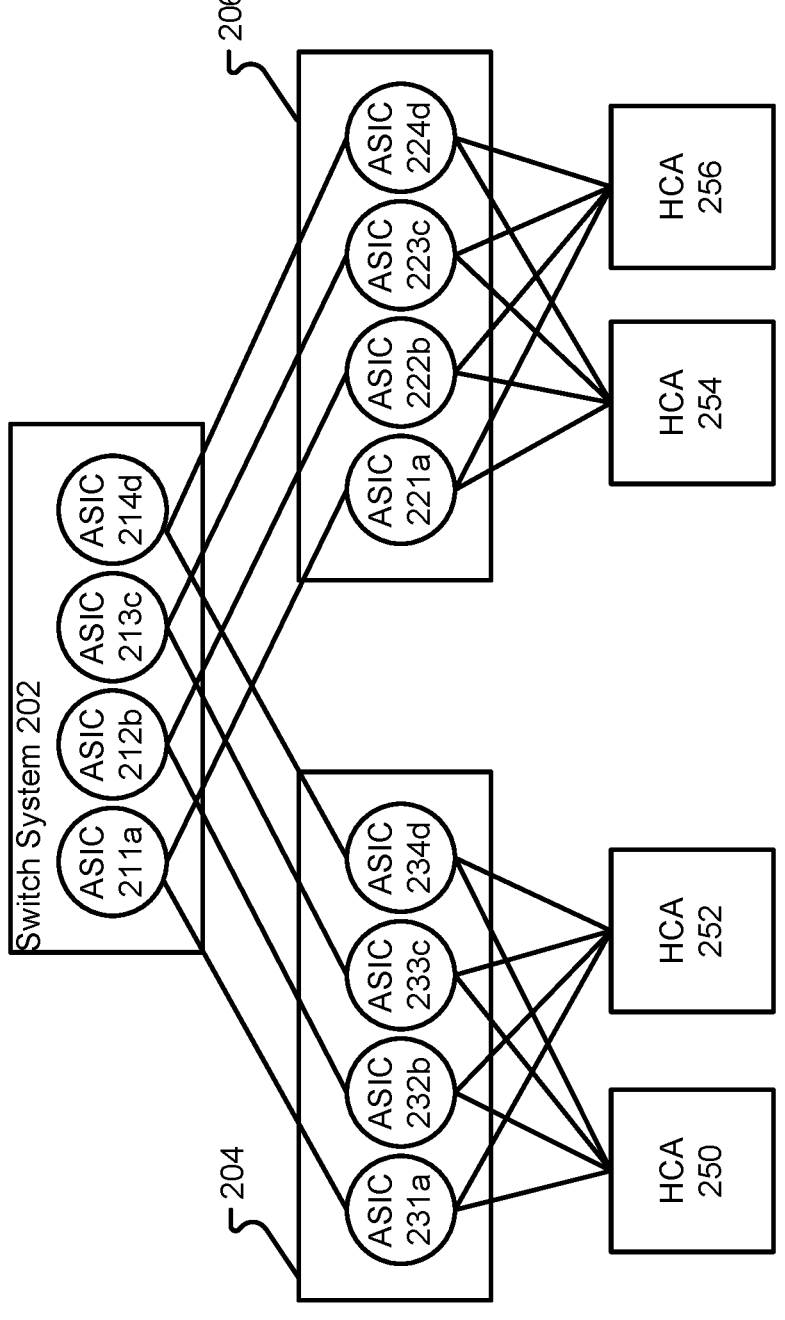
FIGS. 2A-2B illustrate block diagrams depicting an example planarized network in accordance with at least some embodiments of the present disclosure.

FIG. 2A illustrates a block diagram of a planarized network. As illustrated in FIG. 2A, each switch system includes switch systems 202, 204, and 206. Each switch system 202, 204, and 206 includes four ASICs. Specifically, switch system 202 includes ASICs 211*a*, 212*b*, 213*c*, and 214*d;* switch system 204 includes ASICs 231*a*, 232*b*, 233*c*, and 234*d;* and switch system 206 includes ASICs 221*a*, 222*b*, 223*c*, and 224*d*. Each ASIC is on a separate plane as denoted by a-d that is logically independent from the other planes. For example, if HCA 250 and HCA 254 communicate over a first plane (a), traffic may travel from the HCA 250 to ASIC 231*a* to ASIC 211*a* to ASIC 221*a* to the HCA 254. In other words, the letters a-d correspond to the separate planes. Host Channel Adaptors (HCAs) 250, 252, 254, and 256 exist on all planes at the same time. In other words, the HCAs 250, 252, 254, and 256 are plane-agnostic. Single-ASIC switching elements belong to a single plane (e.g., all "a" ASICs are one a first plane, all "b" ASICs are on a second plane, all "c" ASICs are on a third plane, and all "d" ASICs are on a fourth plane).

Generally, a specific plane is not specified for transmission of data traffic. Rather, the planarized network relies on parallel (randomly uniformly spread) transmission of the data on all planes to achieve maximum bandwidth. In this example, a set of four single-ASIC switching elements form one switch system. From a network point-of-view, the four ASICs are separate from each other (e.g., on different planes). The ASICs may share housing and/or some external utilities such as power, cooling, a computation unit, etc. Four planes are shown for illustrative purposes but should not be construed as limiting embodiments of the present disclosure, it is understood that the planarized network may include more or fewer planes.

Figure 2B:
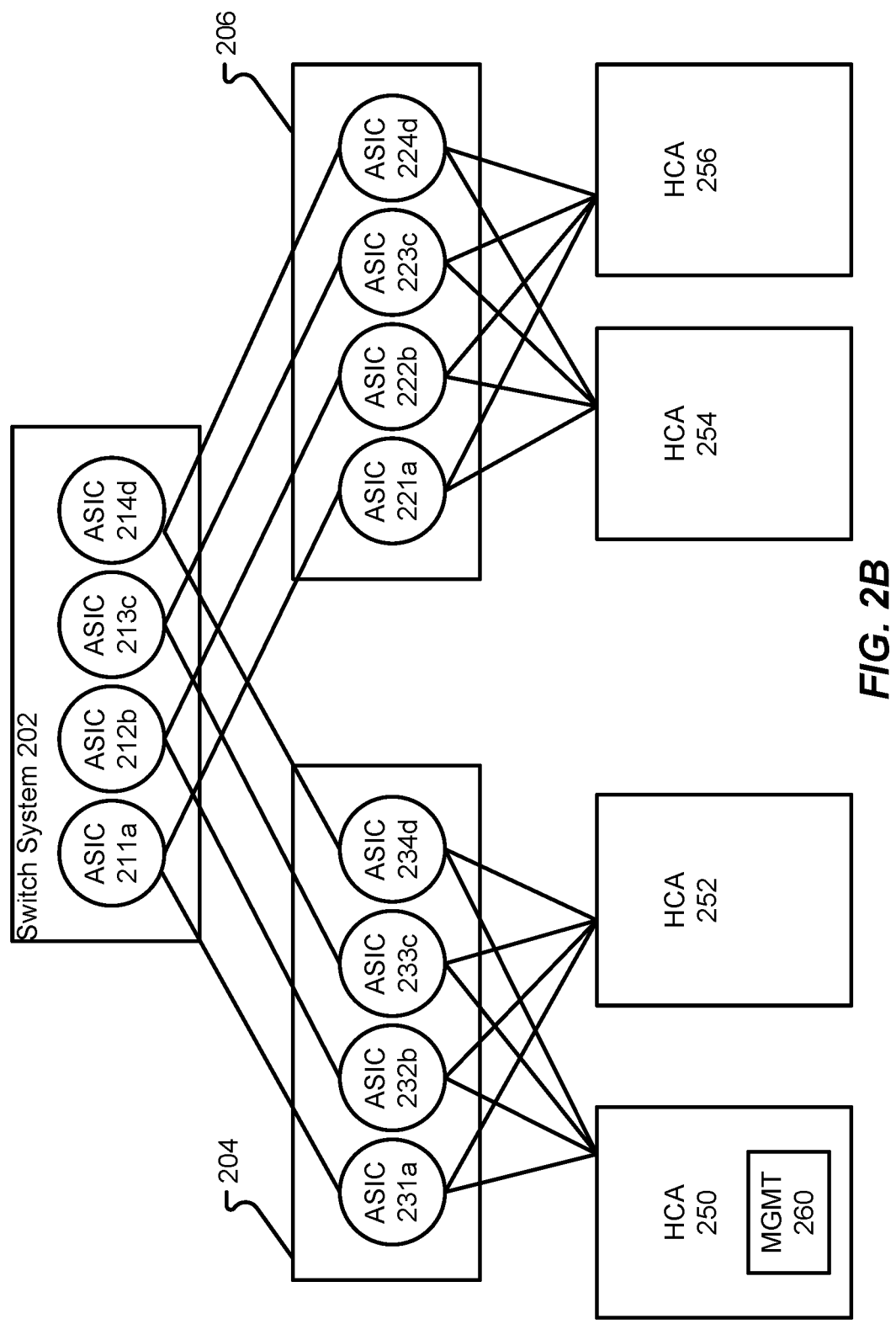

Regarding management in a planarized network, reference is made to the block diagram illustrated in FIG. 2B. In a planarized network, the network management program 260 is plane-aware. For the network management program 260 point-of-view, the planes behave like separate topological components inside a single large topology. Again, four planes are illustrated, but the planarized network may have more or fewer planes. Since the four ASICs of a switch system are considered separate elements of the network, each ASIC needs to be able to be separately reached and queried for information specific to it. In other words, the system needs a way to reach a specific ASIC by accessing a specific plane. For example, the system needs to access ASIC 231*a* on the first plane.

There may also be other circumstances (such as IP over InfiniBand (IPoIB) when the system needs the ability to reach a specific ASIC by accessing a specific plane. However, the network management program software is hosted on a server that is connected through an adapter like all other HCAs, which are plane agnostic; and therefore, there is no way to directly communicate with a specific ASIC on a specific plane.

Figure 3:
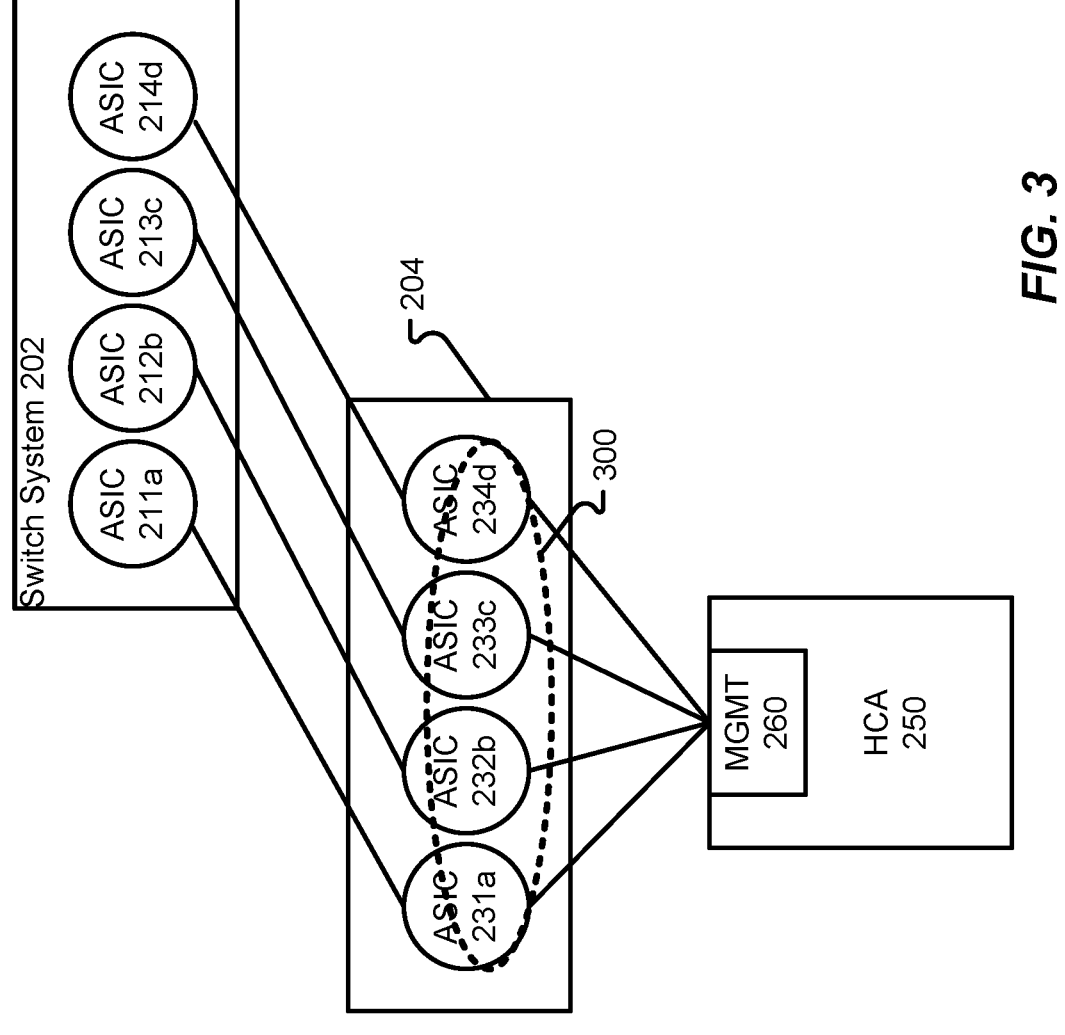
FIG. 3 illustrates an example ring mechanism to prevent credit loops in accordance with at least some embodiments of the present disclosure.

The ring mechanism 300, illustrated in FIG. 3, introduces inter-plane connectivity between planes/switching elements (e.g., ASICs) in the same switch system (e.g., switch system 202, 204, and 206). Through the ring mechanism 300, a packet can cross to a desired plane to ultimately reach its destination ASIC on a specific plane. For example, in the switch system 204 a packet may enter on the ASIC 231*a*, but is intended for ASIC 233*c,* so the packet enters the ring mechanism 300 and based on the rules is routed to the intended ASIC 233*c*. In other words, the HCA of the sub manager (SM) picks a plane randomly, and the plane will be corrected to the proper/specific plane after the hop through the switch system 204/ring mechanism 300. This mechanism in practice interweaves the topologies of the separate planes, which, without proper controls, can cause "credit loops." Credit loops are topological artifacts that can cause traffic jams in the network. Credit loops happen when congestion coincidentally builds up over a closed circular path, which is very damaging to the system's performance.

Figure 4:
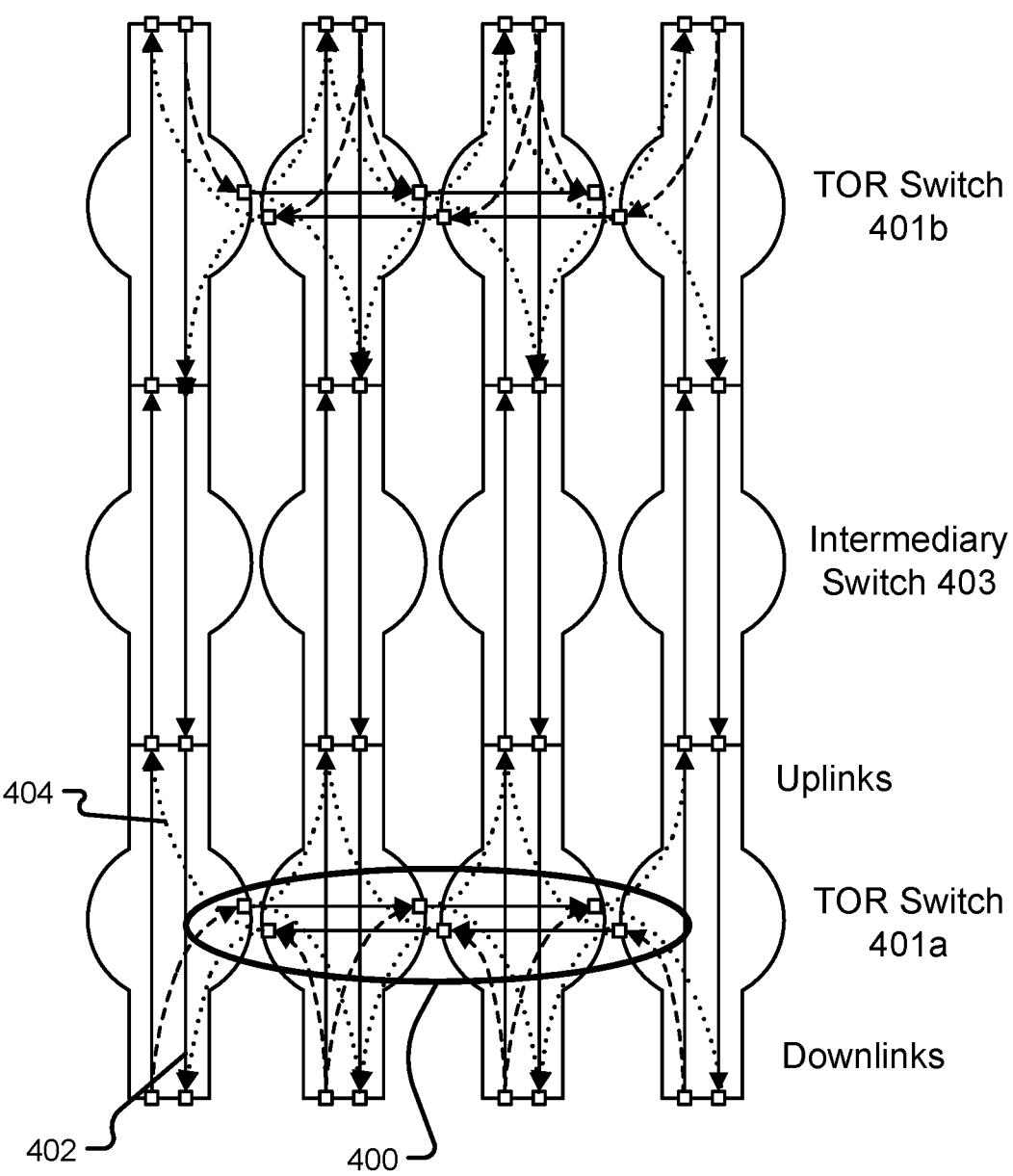
FIG. 4 illustrates an example ring mechanism to prevent credit loops in accordance with embodiments of the present disclosure.

FIG. 4 illustrates a special way to route traffic in a planarized topology with a ring mechanism 400 that eliminates credit loops entirely. The ring mechanism 400 is generated using a set of rules that permits plane crossing when: (1) the switch is a TOR switch, the ring mechanism is only used in TOR switches (e.g., TOR switches 401*a-b*), not in intermediary switches (e.g., intermediary switch 403); (2) the traffic is addressed to a specific switching element (e.g., an ASIC's LID); (3) either only downlink traffic (e.g., 402) or uplink traffic (e.g., 404) is allowed to enter the ring mechanism 400, but not both; (4) the ring mechanism 400 forwarding is broken to form an open line segment; and (5) one link is turned off and maintained as backup.

Referring now to FIG. 5, an illustrative method 500 will be described in accordance with at least some embodiments of the present disclosure. The method 500 may be performed in a switch 104 by a processor 132 implementing a switching engine 144. Alternatively, or additionally, the method 500 may be performed in one or multiple communication nodes 112 by a processor 132 implementing a switching engine 144.

The order of operations depicted in FIG. 5 should not be construed as limiting embodiments of the present disclosure. For instance, certain steps may be performed in a different order without departing from the scope of the present disclosure. Furthermore, some steps may be performed in parallel (e.g., simultaneously) with one another.

The method 500 begins by connecting a plurality of communication nodes in an inter-plane network via a plurality of switching elements (step 504). The plurality of communication nodes 112 may be connected to the switch 104 via one or more ports 108 of the switch 104. In some embodiments, each communication node 112 may be connected to one port 108 of the switch 104 via a data uplink 120 and another port 108 of the switch 104 via a data downlink 124. In some embodiments, networking cables and/or pluggable network adapters may be used to connect the communication nodes 112 to one or more ports 108 of the switch 104. As can be appreciated, the nature of the switch 104 (e.g., whether the switch 104 is an optical switch or an electrical switch) may determine the type of networking cable that is used to connect the communication nodes 112 to the switch 104.

The method 500 may continue by generating a ring mechanism based on a set of rules (step 508). The method 500 may further include providing inter-plane connectivity between the plurality of switching elements using the ring mechanism (step 512). The method 500 may further include controlling transmission of packets between the switching elements using the ring mechanism (step 516).

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A network device, comprising:
a plurality of switching elements to route traffic, wherein each switching element in the plurality of switching elements corresponds to a different plane from a plurality of planes for carrying the traffic from the plurality of switching elements to one or more endpoints; and
a ring mechanism to permit inter-plane connectivity between the plurality of switching elements by routing the traffic between the plurality of switching elements based on a set of rules, wherein the set of rules indicates that when uplink traffic is permitted to cross planes via the ring mechanism, downlink traffic is not permitted to cross planes via the ring mechanism, and when downlink traffic is permitted to cross planes via the ring mechanism, uplink traffic is not permitted to cross planes via the ring mechanism.

2. The network device of claim 1, wherein the plurality of switching elements are provided in a Top-of-rack (TOR) switch.

3. The network device of claim 1, wherein the plurality of switching elements comprise Single-Application Specific Integrated Circuit (ASIC) switching elements.

4. The network device of claim 1, wherein each switching element in the plurality of switching elements is assigned a unique local identifier (LID).

5. The network device of claim 1, wherein each switching element in the plurality of switching elements has its own forwarding table for inter-plane connectivity.

6. The network device of claim 1, wherein routing the traffic between the plurality of planes comprises parallel transmission across two or more of the plurality of planes.

7. The network device of claim 1, wherein the plurality of switching elements comprises at least four switching elements.

8. The network device of claim 1, wherein the set of rules indicate that only traffic addressed to a local identifier (LID) assigned to a switching element is permitted to cross planes.

9. The network device of claim 1, wherein the ring mechanism is to route the traffic as electrical signals between the plurality of switching elements.

10. The network device of claim 1, wherein the ring mechanism includes an open line segment.

11. The network device of claim 10, wherein the open line segment is created by reserving one link in the ring mechanism as a backup path, and wherein the one link is not used to transport traffic.

12. The network device of claim 1, wherein the ring mechanism and the plurality of switching elements are implemented in a switch that connects one or more servers to one or more other switches.

13. The network device of claim 1, wherein the one or more endpoints include one or more servers in a high-performance computing network.

14. A system for routing data traffic, comprising:

a switch comprising a plurality of switching elements to route the data traffic, wherein each switching element in the plurality of switching elements corresponds to a different plane of a plurality of planes for carrying the data traffic from the plurality of switching elements to one or more endpoints; and a ring mechanism to permit inter-plane connectivity between the plurality of switching elements by routing the data traffic between the plurality of switching elements based on a set of rules, wherein the set of rules indicates that when uplink data traffic is permitted to cross planes via the ring mechanism, downlink data traffic is not permitted to cross planes via the ring mechanism, and when downlink data traffic is permitted to cross planes via the ring mechanism, uplink data traffic is not permitted to cross planes via the ring mechanism.

15. The system of claim 14, further comprising:

a network of switches to route the data traffic to the one or more endpoints, wherein the one or more endpoints comprise a host channel adapter (HCA).

16. The system of claim 15, wherein the HCA is plane agnostic.

17. The system of claim 14, wherein the plurality of switching elements comprises at least four Single-Application Specific Integrated Circuit (ASIC) switching elements housed in a same housing, and wherein the plurality of switching elements share external utilities.

18. A device, comprising:

a plurality of switching elements for routing traffic to an endpoint, wherein each switching element in the plurality of switching elements corresponds to a different plane of a plurality of planes; and a ring mechanism to control inter-plane connectivity between the plurality of switching elements by routing the traffic between the plurality of switching elements based on a set of rules, wherein the set of rules indicates that when uplink traffic is permitted to cross planes via the ring mechanism, downlink traffic is not permitted to cross planes via the ring mechanism, and when downlink traffic is permitted to cross planes via the ring mechanism, uplink traffic is not permitted to cross planes via the ring mechanism.

19. The device of claim 18, wherein the plurality of switching elements are provided in a Top-of-rack (TOR) switch, and wherein the plurality of switching elements comprise Single-Application Specific Integrated Circuit (ASIC) switching elements.

20. The device of claim 18, wherein the set of rules indicate one or more of: (i) only traffic addressed to a local identifier (LID) assigned to a switching element is permitted to cross planes; and (iii) one link in the ring mechanism is reserved as a backup path and is not used to transport data traffic.

* * * * *